June 29, 1943.  J. E. POLLOCK  2,322,881
SOLVENT TREATING
Filed Jan. 8, 1941
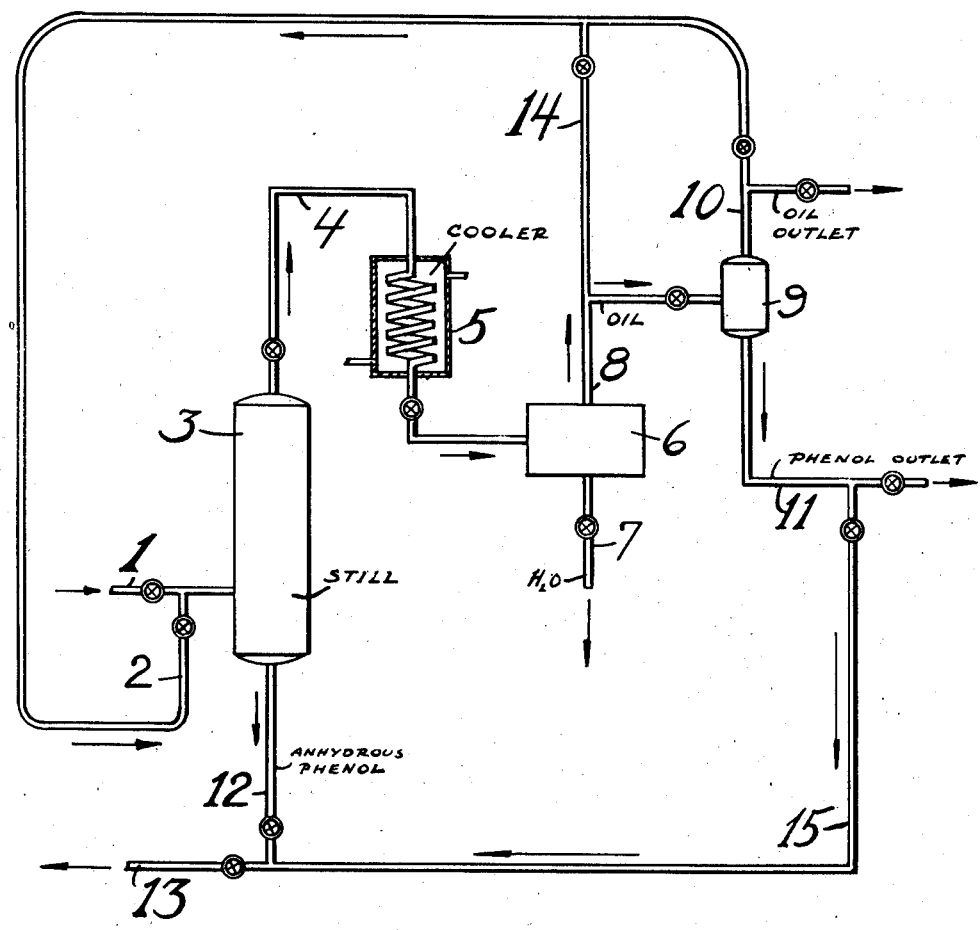
John E Pollock Inventor
By P. L. Young Attorney Patented June 29, 1943

2,322,881

UNITED STATES PATENT OFFICE 2,322,881

SOLVENT TREATING

John E. Pollock, Bromley, England, assignor to Standard Oil Development Company, a corporation of Delaware Application January 8, 1941, Serial No. 373,528

10 Claims. (Cl. 202—41)

The present invention relates to the solvent treatment of mineral oils. The invention is more particularly directed to the recovery of the primary selective solvent from the oil, and is especially concerned with the recovery of phenol from constant boiling mixtures of phenol and water. The present application contains subject matter in common with and is a continuation-in-part of my application entitled, "Recovery of phenol from constant boiling mixtures," Ser. No. 121,815, filed January 22, 1937.

It is well-known in the art to treat petroleum oil with various selective solvents or solvent mixtures which have the ability to segregate the relatively more paraffinic constituents from the relatively more aromatic-type constituents. In these processes solvents of the class of solvents which have a preferential selectivity for the relatively more aromatic-type compounds are usually employed. Solvents of this class are, for example, phenol, furfural, nitrobenzene, sulfur dioxide, cresol, anilin, beta beta dichlordiethyl ether, and the like. It is also known to employ other substances as, for example, substances of the class of liquefied normally gaseous hydrocarbons in combination with the above-described class of solvents. In these solvent treating processes the oil and the solvent are contacted by various means as, for example, by batch or by semi-batch operation. However, the usual method of treating the oil with the solvent is to contact the oil and solvent in a countercurrent treating tower process in which the heavier phase, usually the solvent, is introduced at the top of the countercurrent treating tower, while the lighter phase, usually the oil, is introduced at the center or at the bottom section of the tower. Efficient contact between the countercurrently flowing phases is secured by suitable distributing and contacting means, such as contact masses, distributing trays, pierced plates, and the like. Temperature and pressure conditions are maintained in the tower to secure the formation of a relatively solvent-poor or raffinate phase, highly paraffinic in nature, and a solvent-rich or solvent extract phase, highly aromatic in nature. The respective phases are segregated and removed from the tower. The solvent is then separated from the extract and raffinate phases by suitable means, usually by distillation.

A particularly desirable selective solvent comprises substantially anhydrous phenol. However, in the conventional phenol-treating operation the bulk of the phenol is removed from the raffinate and extract oil by distillation and the last traces are removed by steam distillation. In the steam distillation stage of the recovery process, a mixture of phenol and water is obtained from which it is extremely difficult to fully recover the phenol due to the fact that a constant boiling mixture of phenol and water results. Since the economic success of a commercial phenol treating operation depends to a great degree upon the extent to which the solvent is recovered, many suggestions have been made and operations employed in order to achieve this result. A common operation is to salt out the phenol by the addition of sodium chloride to the constant boiling mixture. This operation is cumbersome and relatively uneconomical.

I have now discovered a method for recovering substantially anhydrous phenol from its constant boiling mixtures with water. According to my invention, the constant boiling mixture is distilled in the presence of a third hydrocarbon component which has a preferential solubility for the phenol. In accordance with my process, a low boiling hydrocarbon oil, that is, one which boils at the temperature at which the constant boiling mixture is vaporized is first added to the constant boiling mixture, and the three component system then distilled. Under these conditions, the added low boiling hydrocarbon oil and the water are removed overhead as vapors. The vapors carried overhead are condensed and two distinct phases are formed, a water phase containing only a relatively small quantity of phenol and an oil phase containing the bulk of the phenol removed overhead with the hydrocarbon vapors and the water. The oil phase is readily separable from the water phase and the phenol recovered from the oil phase by distillation or other suitable means. The bottoms product removed from the initial distillation unit comprises substantially anhydrous phenol.

The process of my invention may be readily understood by reference to the attached drawing illustrating one modification of the same. For the purpose of description, it is assumed that the phenol-water constant boiling mixture is segregated from a phenol solvent treating operation. The constant boiling mixture comprising phenol and water is introduced into the system by means of feed line 1. A relatively low boiling petroleum oil, that is, one which boils at a temperature below the boiling point of the constant boiling mixture, is introduced into the constant boiling mixture by means of line 2 and a three component system then introduced into distillation zone 3. Temperature and pressure conditions are adjusted to remove overhead by means of line 4 the added relatively low boiling petroleum oil and the water. Under these conditions a relatively small amount of the phenol may also be removed overhead with the hydrocarbon oil and the water. The overhead vapors are condensed in cooler 5 and passed into separation zone 6 in which a water phase and an oil phase form. Under these conditions, the bulk of any phenol removed overhead collects in the oil phase. The water phase is removed from separation zone 6 by means of line 7 and handled in any desirable manner. The oil phase is removed from separation zone 6 by means of line 8 and passed into a secondary distillation zone 9 in which the phenol is removed from the oil. The oil is removed overhead by means of line 10 and recycled if desired while the phenol is removed by means of line 11. Under certain conditions the oil phase may be recycled directly by means of line 14. However, it is preferred to distill the oil before recycling the same. Substantially anhydrous phenol is removed from distillation zone 3 by means of line 12 and recycled to the solvent treating system by means of line 13. If desired, any phenol removed from distillation zone 9 may be passed through line 15 and combined with the anhydrous phenol removed by means of line 12 and likewise recycled.

The process of the present invention may be widely varied; in general, the light hydrocarbon oil added to boil in the general range below the boiling point of phenol and preferably below the temperature at which the constant boiling mixture of phenol and water boils. Hydrocarbon oils suitable for the purpose are for example naphthas, heavy naphthas, hydrogenated naphthas, benzol, toluol, light gas oil and similar lower boiling hydrocarbons. The amount of low boiling hydrocarbon oil added also may vary considerably; in general, it is preferably 2 to 10 volumes, although 3 to 7 volumes of oil per volume of constant boiling mixture is preferred.

The mixture of constant boiling mixture and hydrocarbon oil is conveniently introduced near the bottom of a packed tower placed over a still charged with a constant boiling mixture of phenol and water. The hydrocarbon oil may of course be continuously recycled through the process after removal of its content of phenol.

This recovery process is not restricted to a process for treating lubricating oils with anhydrous phenol but is applicable to any constant boiling mixture of phenol and water no matter from what source it is obtained.

In order to further illustrate the invention the following examples are given which should not be construed as limiting the same in any manner whatsoever.

*Example 1*

A naphtha with a boiling range of 200 to 300° F. is added in the bottom of a packed tower placed in a still charged with a constant boiling mixture of phenol and water, and the mixture distilled. The following table shows comparative results, first when no naphtha is added and then when different volumes of naphtha are added:

| Volumes naphtha phase | Volumes water phase | Per cent phenol in water phase |
|---|---|---|
| 0 | 1 | 8.9 |
| 2½ | 1 | 6.6 |
| 5 | 1 | 4.3 |

It will be seen that as the volume of naphtha used is increased, the percent of phenol remaining in the water phase is substantially decreased, indicating that the phenol is being removed in the naphtha phase.

*Example 2*

In another experiment benzol is used instead of naphtha with the following results:

| Volumes benzol phase | Volumes water phase | Per cent phenol in water phase |
|---|---|---|
| 0 | 1 | 8.9 |
| 2¼ | 1 | 1.5 |
| 5 | 1 | 1.0 |
| 7 | 1 | 0.5 |

It will be seen that with 7 volumes of benzol the recovery of phenol from the constant boiling mixture is substantially complete.

It will be understood that various mixtures of low boiling hydrocarbon oils may be used as well as pure substances, the only essential requirement being the hydrocarbon mixture be vaporized at the temperature in the still so that it may be carried overhead with the water.

This invention is not limited by any theories of the mechanism of the process nor by any details which have been given merely for purposes of illustration, but is limited only in and by the following claims in which it is intended to claim all novelty inherent in the invention.

I claim:

1. Process for recovering phenol from constant boiling mixtures of phenol and water which comprises adding to said constant boiling mixture a low boiling hydrocarbon which boils in the range below the boiling point of pure phenol, distilling the mixture in a manner to remove overhead substantially the entire quantity of water and the added hydrocarbon, removing as a bottoms substantially anhydrous phenol, condensing the overhead by distillation whereby an oil phase and a water phase are formed, separating the oil phase from the water phase, and removing phenol from the oil phase.

2. Process in accordance with claim 1 in which said hydrocarbon boils in the range from about 200° F. to 300° F.

3. Process in accordance with claim 1 in which said low boiling hydrocarbon oil is selected from the class consisting of naphtha, benzol, toluol, hydrogenated naphtha and light gas oil.

4. Process in accordance with claim 1 in which from 3 to 7 volumes of hydrocarbon oil are added per volume of constant boiling mixture.

5. Process for recovering phenol from constant boiling mixtures of phenol and water which comprises adding to said mixture from 3 to 7 volumes of a hydrocarbon oil boiling in the range from about 200° F. to 300° F., distilling this mixture under conditions in which substantially all the water and substantially all the added hydrocarbon oil are removed overhead, removing as a bottoms from said distillation step substantially anhydrous phenol, condensing said overhead from said distillation operation whereby an oil phase and a water phase are formed, separating the oil phase from the water phase and removing phenol from said oil phase by distillation.

6. Process for recovering phenol from constant boiling mixtures of phenol and water which comprises adding to said constant boiling mixture a low boiling petroleum hydrocarbon which boils at about the temperature at which the constant boiling mixture is vaporized, distilling the mixture in a manner to remove overhead substantially the entire quantity of water and the added petroleum hydrocarbon, removing as a bottoms substantially anhydrous phenol, condensing the overhead in a distillation operation whereby an oil phase and a water phase are formed, separating the oil phase from the water phase and recovering phenol from the oil phase.

7. Process for recovering phenol from constant boiling mixtures of phenol and water which comprises distilling the constant boiling mixture in the presence of a hydrocarbon oil vaporizable at the temperature of the distillation, removing and condensing the vapors from the distillation to form a liquid body having an oil phase and a water phase, continuously separating the oil phase from the water phase, and recovering phenol from the oil phase.

8. Process for recovering phenol from constant boiling mixtures of phenol and water which comprises adding to the constant boiling mixture several volumes of a low boiling hydrocarbon oil, distilling the three component mixture, removing and condensing the vapors thereby formed, continuously separating the oil phase from the water phase, and recovering phenol from the oil phase.

9. Process according to claim 8 in which the low boiling hydrocarbon oil is selected from the class consisting of naphtha, benzol, toluol, hydrogenated naphtha, and light gas oil.

10. Process according to claim 8 in which from 3 to 7 volumes of hydrocarbon oil are added per volume of constant boiling mixture.

JOHN E. POLLOCK.